Figure 1:
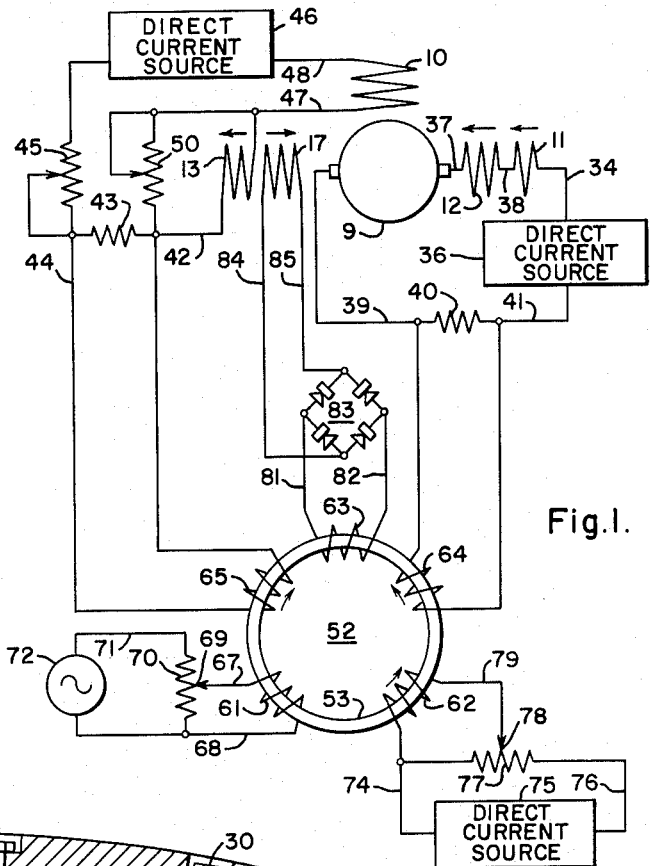

July 26, 1966  M. J. ROBINETT  3,263,147
CONTROLLED DIFFERENTIAL AUXILIARY COMMUTATOR WINDING
Filed June 7, 1963

WITNESSES:
Bernard R. Gieguey
James F. Young

INVENTOR
Max J. Robinett
BY Maury I. Hull
ATTORNEY

United States Patent Office 3,263,147
Patented July 26, 1966

3,263,147
CONTROLLED DIFFERENTIAL AUXILIARY
COMMUTATOR WINDING
Max J. Robinett, Rochester, Minn., assignor to Westinghouse Electric Corporation, East Pittsburgh, Pa., a corporation of Pennsylvania
Filed June 7, 1963, Ser. No. 286,393
16 Claims. (Cl. 318—353)

This invention relates to improvements in direct current motors, and more particularly to an improved direct current shunt motor utilizing commutating poles and having means for automatically regulating the strength of the flux at and in the vicinity of the commutating poles in accordance with variations in the speed and load of the motor, to provide optimum commutating efficiency and a reduction in sparking at the commutator.

It has been known for some years that in large variable speed direct current motors, in which a considerable speed variation is obtained by adjustment of the shunt field excitation, when the shunt field excitation is increased, at some predetermined load, such as full load, certain increases should be made in the interpole flux which is produced by the commutating pole winding in series with the armature, otherwise poor commutation results. One of the earliest prior art attempts to overcome this difficulty was to provide an adjustable resistance shunt around the series commutating winding in order to provide for a properly adjusted commutating pole field strength. This had the disadvantage, however, that such machines had to be individually tested in the factory before being shipped for use, because the currents involved were large, commutation was difficult to achieve, and the conditions of individual motors were sufficiently different to require individual factory adjustment on each motor.

One prior art circuit for solving the problem was a special shunting circuit connected across at least the commutating winding of the machine and preferably across the commutating and compensating windings considered as a unit. This special shunting circuit contains two serially-connected resistance devices, and a means is provided for circulating through one of these resistance devices a controlling current component having a value which is substantially independent of the armature current in the machine. Such a circuit is described and claimed in Patent No. 2,693,564, issued November 2, 1954, to M. J. Pasculle for "Interpole Winding Shunting," and assigned to the assignee of the instant invention.

This circuit, however, did not provide a complete solution to the problem of no load sparking, generally as a result of sprayed flux from the main pole tip into the commutating zone. When this no load sparking has occurred, considerable time and money have been spent on the test floor by minutely adjusting the brushes to their positions of best commutation, sometimes machining off the edge of the main pole tips, and sometimes resorting to other expedients.

In order to overcome these disadvantages, it was conceived to provide a cumulatively acting auxiliary commutating winding, adjustably excited from the same current or voltage which is supplied to the shunt field winding. Since the shunt field excitation is never zero, the excitation of the auxiliary commutating winding is never zero, thus producing an interpole excitation in the direction which is necessary to reduce or prevent no-load sparking, while at the same time effecting the necessary adjustments of the interpole flux under different shunt field excitation conditions. Such a circuit is described and claimed in Patent No. 2,666,882, issued January 19, 1954 to M. J. Pasculle for "Auxiliary Commutating Field," and assigned to the assignee of the instant invention.

The apparatus of the last-named patent, however, while representing an improvement over any and all prior art circuits, was not a perfect solution to the problem of obtaining commutation without sparking over all the ranges from no load to more than full load, and over all the speed ranges of which a machine was capable. In some instances, the interpole excitation was too much at no load, in which case it was necessary to reduce the auxiliary winding excitation somewhat so as to obtain not quite the best commutation at full load, but still giving preference to the commutation conditions at full load as distinguished from the commutation conditions at no load.

Further progress was made in the problem of obtaining substantially perfect commutation from no load to more than full load and over all speed ranges by utilizing a differential auxiliary commutating winding excited in a certain way and arranged to have the flux produced thereby in opposition to or buck the flux produced by the commutating pole winding in series with the armature. Apparatus embodying such an inventive concept is shown and described in Patent No. 2,666,881, issued January 19, 1954, to F. E. Williams for "Auxiliary Commutating Field Winding," and assigned to the assignee of the instant invention.

The last-named patent, however, did not represent a complete solution to the problem in view of the fact that two resistors had to be adjusted together, one of these resistors being in series with the shunt field winding, and the other resistor in series with the auxiliary commutating winding.

A more nearly perfect solution is provided by apparatus described and claimed in the copending application of Daniel M. Calabrese et al. for "Differential Bias Auxiliary Commutating Field," filed January 29, 1962, Serial No. 169,321, and now Patent No. 3,201,626 and assigned to the assignee of the instant invention. In this patent application of Calabrese et al., there are three windings on the interpole or commutating pole. One of these is the conventional commutating pole winding in series with the compensating winding on the face of the field pole, both carrying the armature current; another is an auxiliary commutating winding in series with the shunt field winding and cumulative with respect to the commutating pole winding as far as flux is concerned. The third winding on the interpole or commutating pole is wound and excited differentially with respect to both the auxiliary commutating winding and the commutating winding, is separately excited from a direct current source, and has in series therewith a variable resistor for manually adjusting the value of the energization of this differential bias auxiliary commutating winding. The purpose of this additional or third winding is to buck out the field of the auxiliary commutating winding in series with the shunt field at no load and low load conditions, when the ideal commutating condition may call for no flux or a very small flux at the commutating pole. It will be readily understood by those skilled in the art that the distortion of the flux at the field pole is a function of the load, and accordingly it is desirable that the flux at the interpole vary as a function of load also to maintain the precise neutral position as far as the commutator is concerned.

The apparatus of the copending patent application of Calabrese et al. represents a significant improvement over the prior art; it effectively prevents excessive interpole flux at no load, and particularly at top speed or weak field. It eliminates the necessity for some compromise in the excitation provided to the auxiliary winding so as to obtain not quite the best commutation at full load but still giving preference to the commutation conditions at full load as distinguished from the commutation conditions at no load.

The apparatus of the aforementioned copending application, however, has one disadvantage or limitation. If the speed of the motor is changed by adjusting the shunt field rheostat, it is necessary to make a corresponding manual adjustment in the rheostat in series with the third or differential commutating winding.

The apparatus of the instant invention overcomes this and other disadvantages of the prior art by providing a differential auxiliary commutating field flux which is automatically adjusted to the proper value as the current through the shunt field is increased or decreased to decrease or increase the speed of the motor.

In summary, the apparatus of the instant invention includes but is not limited to a direct current motor having in addition to a shunt field winding, the energization of which is adjustable by a rheostat or other means, a commutating winding on an interpole or commutating pole and a compensating winding on the face of the field pole, these two windings being connected in series with the armature, and in series with a resistor, the voltage drop across which resistor varies with variations in the armature current. This resistor is connected across one bias or control winding of saturable magnetic means which may be a saturable core transformer having control bias windings in addition to input and output windings, or may be a magnetic amplifier. The core is energized by an alternating current of adjustable magnitude, and an output winding on the core has the output thereof rectified to direct current and supplied as energization to a differential third winding on the commutating pole, this differential third winding being in addition to the commutating winding and an auxiliary commutating winding in series with the shunt field. In the shunt field circuit, in addition to the auxiliary commutating winding, the field winding, and rheostat means for controlling the current flow therethrough, there is a resistor carrying the shunt field current which has a voltage drop thereacross which varies in accordance with variations in the shunt field current, and the voltage drop across this last-named resistor energizes an additional bias winding on the core of the magnetic amplifier or saturable core transformer, the additional bias winding being differential with respect to the first-named bias winding on the core, which first winding is cumulative with respect to the steady state bias or steady state flux condition in the core. As the load or armature current increases, the first bias winding is energized to a position whereat it saturates the magnetic amplifier core and the energization of the differential commutating winding falls to zero. Since the core bias flux under the control of the motor shunt field current is differential to the core bias flux under the control of the armature current, the operating conditions under which the core saturates vary with variations in the shunt field current, and the circuit automatically adjusts itself to the proper operating conditions for variations in the setting of the shunt field rheostat as the speed of the machine is varied.

Accordingly, an object of the invention is to provide new and improved shunt wound direct current motor apparatus having means for automatically adjusting the flux at the commutating poles thereof as the speed and/or load change.

Another object is to provide new and improved commutating pole flux regulating apparatus for use in a shunt motor.

A further object is to provide new and improved flux regulating apparatus for use in a dynamoelectric machine.

An additional object is to provide a new and improved dynamoelectric machine of the commutator type employing interpoles and having means for automatically adjusting the strength of the flux at the interpoles in accordance with changes in the load and speed of the machine.

A still further object is to provide new and improved apparatus including a magnetic amplifier circuit for automatically regulating the flux at the commutating pole of a dynamoelectric machine.

Figure 2:
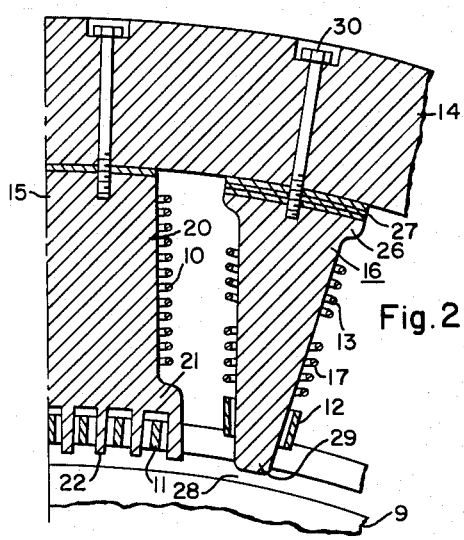

These and other objects will become more clearly apparent after a study of the following specification, when read in connection with the accompanying drawings, in which:

FIGURE 1 is a schematic electrical circuit diagram of apparatus embodying the invention; and FIG. 2 is a fragmentary cross-sectional view through a motor according to the invention, showing the position of the field pole windings and commutating pole windings with respect to the armature thereof.

Referring now to the drawings, in which like reference numerals are used throughout to designate like parts, for a more detailed understanding of the invention, and in particular to FIG. 1 thereof, there is shown at 9 the armature or rotor of a motor, one terminal of the armature 9 being connected by way of lead 39, resistor 40, and lead 41 to one terminal of a source of direct current potential shown in block form at 36. The other terminal of the armature 9 is connected by way of lead 37 to a commutating pole winding 12, which it is understood is wound on the interpoles or commutating poles of the motor. Whereas the single commutating pole winding 12 is shown, it should be understood that these commutating pole windings are a number of series-connected windings on an appropriate number of interpoles. The other terminal of the commutating pole winding 12 is connected by way of lead 38 to a compensating pole face winding 11 which it is understood is located in the pole face portion 21 in slots 22 therein, FIG. 2. Winding 11 may be a number of series connected compensating windings on a number of salient field poles. The other terminal of the compensating winding 11 is connected by way of lead 34 to the other terminal of the aforementioned direct current source 36. It is seen then that the entire armature circuit includes in series the armature, the commutating pole windings on the interpoles, the compensating pole face windings, and a resistor 40 across which is developed a voltage drop or potential difference which varies in accordance with variations in the current therein, and accordingly varies with variations in the armature current as the load of the motor changes.

Wound upon the shank portion 20 of the main field pole 15, FIG. 2, is a shunt field winding 10, the field winding 10 having one end thereof connected by way of lead 48, FIG. 1, to one terminal of a suitable source of direct current field energizing potential 46. Winding 10 may be a plurality of windings on a plurality of poles respectively. The other terminal of the main field winding 10 is connected by way of lead 47 to an auxiliary commutating pole winding 13 wound upon the interpole 16, FIG. 2, the other end of the auxiliary commutating winding 13 being connected by way of lead 42 to one end of a resistor 42 which has the other end thereof connected by way of lead 44 to a rheostat 45 which is connected to the other terminal of the direct current source 46. Winding 13 may comprise a plurality of windings on a plurality of interpoles. Connected across the auxiliary commutating winding 13 between leads 47 and 42 is a rheostat 50 for regulating the division of current between the auxiliary winding 13 and the rheostat, to control the current in the auxiliary interpole winding 13 and accordingly control the flux generated thereby.

There is shown generally designated at 52 a saturable transformer or a magnetic amplifier, having a core 53 which is composed of saturable material and may have a B–H characteristic curve approaching the "square loop" type of curve. The core 53 has five windings thereon designated 61, 62, 63, 64 and 65. These windings, as will become more clearly apparent hereinafter, are wound in particular fashions and so excited with respect to each other that the fluxes generated therein will be cumulative or differential. Winding 61 is an energizing winding, and has the terminals thereof connected to leads 67 and 68, lead 67 being connected to the arm 69 of a potentiometer 70 connected at one end to lead 68, and the other end of the potentiometer 70 is connected to lead 71. Leads 68 and 71 are connected to a suitable alternating current source of excitation 72 for the winding 61, the value of the excitation being adjustable by adjusting the position of the potentiometer arm 69.

The second winding on the aforementioned magnetic amplifier core 53 is a steady-state bias winding 62 having one terminal thereof connected by way of lead 74 to a source of direct current energizing potential 75, which has the other terminal thereof connected by way of lead 76 to one terminal of a potentiometer 77 which has the other terminal thereof connected to lead 74. The arm 78 of the potentiometer 77 is connected by way of lead 79 to the other terminal of the bias winding 62. The purpose of the bias winding 62 is to establish a steady-state flux condition in the core 53, the amplitude of which can be adjusted by adjusting the position of arm 78 of potentiometer 77, for purposes which will be readily understood by those skilled in the magnetic amplifier art.

The third winding 63 on the magnetic amplifier core 53 is an output winding having the terminals thereof connected by way of leads 81 and 82 to the input terminals of a full wave rectifier generally designated 83, the output of which is delivered to leads 84 and 85 which are connected to the aforementioned differential winding 17 on the interpole for energizing the differential winding 17 with a current which varies in accordance with variations in the output of the magnetic amplifier, said variations being under the control of means to be hereinafter described. It may be stated here, however, that the flux in winding 17 is a function of both the load current in the armature and the shunt field current. Winding 17 may be a plurality of windings on a plurality of interpoles.

The fourth winding on the aforementioned magnetic amplifier core 53 is designated 64, and has the terminals thereof connected to the aforementioned leads 39 and 41 which conduct the current which flows through the armature 9; the winding 64 is a bias winding energized by the potential drop across the aforementioned resistor 40 variably in accordance with variations in the load current in the armature 9. The winding 64 is wound in a predetermined manner and the polarity of the signal applied thereto is carefully selected so that the flux in the winding 64 is cumulative with respect to the biasing flux, if any, produced in the bias winding 62.

The fifth winding 65 on the magnetic amplifier core 53 has the terminals thereof connected to the aforementioned leads 42 and 44 which carry the field current in winding 10, and the signal across the winding 65 varies in accordance with variations in the voltage drop across resistor 43, accordingly varies in accordance with variations in the current in the field winding 10, and hence in accordance with variations in the strength of the field. The winding 65 is wound, and the polarity of the signal applied thereto is carefully selected, so that the flux in the winding 65 is differential with respect to the flux in winding 64 and also with respect to the flux in bias winding 62.

It will be understood that the steady state bias winding 62 may be eliminated where it is not necessary to establish a flux level in the core 53 to insure that the core 53 operates over the desired portion of its B–H characteristic curve and/or other magnetization curve.

Whereas the operation of the magnetic amplifier circuit of magnetic amplifier 52 to vary the flux at the interpoles of the motor will be described more fully hereinafter, it will be apparent that the output at coil 63, and accordingly the energization of the differential commutating winding 17, is a function of the armature current which controls the bias in coil 64, and is also a function of the field current which energizes the field winding 10.

Particular reference is made now to FIG. 2, showing in more detail the location of the various windings on an exemplary dynamoelectric machine. As shown in FIG. 2, the field frame of the motor comprises a cylindrical yoke 14 having main poles 15 and commutating poles or interpoles 16 bolted thereto. In accordance with known practice, the main poles have a pole shank portion 20 which carries the shunt field winding which is diagrammatically indicated at 10 in FIG. 2, and a pole tip portion 21 having slots 22 therein for receiving the compensating winding 11. The interpole 16 carries the main or series commutating winding 12, the auxiliary commutating winding 13, and the differential commutating winding 17, all of which are diagrammatically indicated in FIG. 2. In accordance with known practice, the rear end 26 of the interpole or commutating pole 16 is spaced from the yoke or frame member 14 by means of a plurality of magnetizable shims 27, the number of which can be varied for the purpose of adjusting the effective air gap 28 between the face 29 of the interpole and the periphery of the armature or rotor member 9. It will be understood that the number of the rear end shims 27 can be adjusted by removing the bolts 30 and then reassembling the interpole 16 with a desired number of shims. It will be further understood that the position of the interpole on the yoke may be adjustable within small limits, in order to facilitate a "true neutral."

It should be recalled that the magnetic field of the interpole winding 12 and that of the auxiliary interpole winding 13 are cumulative with respect to each other, whereas that of the compensating winding 17 is differential with respect to both the interpole winding 12 and the auxiliary interpole winding 13. The relative positions of the three windings 12, 13 and 17 on the interpole 16 may be interchanged or altered in any desired manner, and it will be understood that the number of turns of the various windings may be selected to give the desired motor operating characteristics.

It follows that the flux of interpole winding 12 will increase with increases in the current in armature 9, and that the flux of auxiliary interpole winding 13 will increase as the field produced by field winding 10 increases, or as the speed of the motor is decreased, whereas the flux in the auxiliary interpole winding 13 will decrease as the field at 10 is decreased and the speed of the motor is increased. Direct current mill motors usually have very stringent requirements as to speed, regulation, and they must commutate satisfactorily over the entire speed range and the entire range of load conditions which may vary from a very light load to a load condition corresponding to two or more times normal full load. In the prior art, the auxiliary commutating windings on the commutating pole provide a means of overlapping the commutating ranges so the machine will commutate at light loads. As will be readily understood, at very light loads, the flux produced by the interpole winding 12 is substantially zero, so that it is desirable to have the auxiliary interpole winding 13 energized by the field current, which is never zero, to provide some flux at the interpole to prevent sparking and other undesirable conditions at the commutator. However, adding the auxiliary winding 13 to the interpole winding 12 has the disadvantage that it boosts the interpole fluff at no load, and is not responsive to changes in the load; this boosting at no load plus the normal retentivity of flux in the armature and poles produces circulating currents in the coils being commutated. These currents are in such a direction that they tend to undercompound the motor, thus making the speed droop from no-load to one-third load too much for control purposes. The boosting at no load and the retentivity should be reduced or eliminated to enable the machine to meet the regulation required in this portion of its operating range, and this is one of the objects of the instant invention. To this end, the differential wound winding 17 is supplied on the interpole or commutating pole 16. The flux of this winding 17 is in opposition to the flux produced by the auxiliary interpole winding 13. The winding 17 is excited so that it will buck out the boost produced by the auxiliary commutating winding and the residual flux at no load. However, the energization of winding 17 is also controlled so that it will vary with the load and become zero at about ⅓ load. As the armature load current increases, the flux at 64 increases, moving the operating point of the core 53 closer to saturation and reducing the output of coil 63. Core saturation occurs at substantially ⅓ full load, but at some value within a range of armature current values depending upon the differential flux of bias coil 65. Above ⅓ load, the auxiliary winding 13 is substantially ineffective, and the effective retentivity approaches zero, and thus regulation is not substantially affected by the auxiliary winding and the retentivity for load conditions of ⅓ load and above.

The magnetic amplifier provides controlled excitation for the differential winding 17 which is characterized by quick response and static operation. As previously stated, the resistor 40 is connected in series with the armature circuit. This resistor 40 could be dispensed with with if desired, and leads to the bias winding 64 directly connected across both the compensating face winding 11 and the commutating pole winding 12. The voltage drop across resistor 40 varies directly with load. As previously stated, the aforementioned bias winding 64 on the magnetic core is wound cumulative and excited across resistor 40; the magnetic amplifier is made to excite the differential winding 17 at no load and produce a decreasing excitation as load increases, which finally cuts off at about ⅓ load. The bias value at 64 can be set to any value corresponding to the amount of flux required by the magnetic amplifier. As previously stated, the resistor 43 is connected in series with the shunt field. The voltage drop across resistor 43 varies with the shunt field current, and the bias winding 65 is connected across resistor 43 to be energized therefrom. This bias winding 65 is wound differential with respect to bias winding 64. This bias winding 65 is desirable because both the retentivity and the auxiliary commutating winding boost have different values at different speeds. Since the shunt field current varies with variations in the motor speed, the output of the differential commutating winding 17 varies with speed, as a result of bias changes with speed at bias winding 65 of the magnetic amplifier. This controlled differential commutating winding 17 thus bucks out the residual and the auxiliary commutating winding boost from zero load to ⅓ load, varying with load and with speed, thus better regulation may be obtained. By suitable choice of component values and core material, the core 53 may be made to saturate at substantially ⅓ load or at any other desired load condition, and the output across the differential interpole winding 17 falls to zero. It is again noted that although the primary winding is excited by an alternating current voltage, the secondary winding 63, since it feeds the differential commutating winding 17 through a full-wave bridge rectifier, produces direct current excitation for the differential commutator winding 17.

Another way of understanding the operation of the circuit is to regard the bias windings 65 and 64 as shifting the operating point of the magnetic amplifier core closer to or farther from the condition of saturation; winding 65 tends to move the point toward saturation; winding 64 retards this movement to a greater or lesser degree.

There has been provided then apparatus well suited to accomplish the aforedescribed objects of the invention. The flux produced by the differential interpole winding 17 is automatically adjusted for variations in load and speed to provide for a flux condition at the interpoles which is correct for various speed and load conditions, and which does not provide excessive flux which produces sparking or under-compounding of the motor.

The term "saturation" as employed herein and in the claims appended hereto is used substantially synonymously with the fall of the output signal in winding 63 to substantially zero.

Whereas the invention has been shown and described with respect to an exemplary embodiment thereof which gives satisfactory results, it should be understood that changes may be made and equivalents substituted without departing from the spirit and scope of the invention.

I claim as my invention:

1. A variable speed direct current motor including an armature, a shunt type field winding, field winding excitation circuit means for varying the excitation of said shunt type field winding over a considerable range, a compensating winding, a commutating winding, armature circuit means including energizing means connecting said armature, said compensating winding and said commutating winding in series, a cumulative auxiliary commutating winding, means for energizing the cumulative auxiliary commutating winding from the excitation circuit means of the shunt type field winding, a differential auxiliary commutating winding, and means including saturable magnetic means operatively connected to the field winding circuit means and to the armature circuit means and responsive to changes in current in both the field winding and the armature for variably exciting the differential auxiliary commutating winding.

2. In a variable speed direct current motor including an armature, a shunt type field winding, and a commutating pole, in combination, at least three windings on said commutating pole, one of said windings having the flux created thereby varying in accordance with variations in the armature current, another of said commutating pole windings having the flux created thereby varying in accordance with variations in the current in the field winding, and the third of said commutating pole windings having the flux created thereby jointly under control of the current in said armature and the current in said field winding to automatically adjust the total flux at the commutating pole for variations in the load and speed of said motor.

3. A variable speed direct current motor including an armature, a shunt type field winding, field circuit means including means for varying the excitation of said shunt type field winding over a considerable range, a commutating winding, armature circuit means including energizing means connecting the commutating winding in series with said armature, an auxiliary commutating winding connected in said field circuit means and having the energization thereof varied in accordance with variations in the energization of the field winding, and means for reducing the effect of said auxiliary commutating winding to substantially zero at no load, said last-named means including a differential auxiliary commutating winding, a source of energizing potential for the differential auxiliary commutating winding, and variable means connecting the source of potential to the differential auxiliary commutating winding, said variable means being operatively connected to the field circuit means and the armature circuit means for varying the energization of the differential auxiliary commutating winding automatically in accordance with variations in the excitation of the field winding and variations in the current in said armature.

4. A variable speed direct current motor including an armature, a shunt type field winding, field circuit means connected to the shunt type field winding including means for varying the excitation of said shunt type field winding over a considerable range, a compensating winding, a commutating winding, armature circuit means including energizing means connecting the compensating winding and the commutating winding in series with the armature, a cumulative auxiliary commutating winding, other circuit means connecting the auxiliary commutating winding to the field circuit means whereby the auxiliary commutating winding is variably excited in accordance with variations in the current in the field winding, and means for reducing the effect of said auxiliary commutating winding to substantially zero at a first predetermined load condition, said last named means including saturable magnetic means having a saturable magnetic core adapted to have a bias applied thereto, a source of excitation for the saturable magnetic means, a differential commutating winding connected to the saturable magnetic means to be energized therefrom, and further circuit means connecting the saturable magnetic means to the armature circuit whereby the core bias of the saturable magnetic means is varied in accordance with variations in the current in the armature, said bias causing the differential commutating winding to buck out the auxiliary commutating winding at said first predetermined load condition, said bias causing the core of the saturable magnetic means to saturate at a second predetermined load condition greater than the first predetermined load condition whereby the excitation of the differential commutating winding is reduced substantially to zero and the auxiliary commutating winding is restored to full effectiveness.

5. A variable speed direct current motor including an armature and energizing means therefore, a shunt type field winding, a shunt field excitation circuit including means for varying the excitation of said shunt type field winding over a considerable range a compensating winding in series with said armature, a commutating winding in series with said armature, a first auxiliary commutating winding, means for energizing the first auxiliary commutating winding from the excitation circuit of the shunt type field winding, a second auxiliary commutating winding, said second auxiliary commutating winding being wound and excited differential to the first auxiliary commutating winding, and means operatively connected to the armature and to the shunt type field winding for varying the excitation of the differential second auxiliary commutating winding in accordance with variations in the current in the shunt field winding and in accordance with variations in the current in said armature.

6. A variable speed direct current motor including in combination, an armature; a compensating winding; a commutating winding; an armature circuit including excitation means connecting the armature, the compensating winding and the commutating winding in series; a shunt type field winding; a shunt field excitation circuit including means for varying the excitation of said shunt type field winding over a considerable range; a cumulative auxiliary commutating winding; means for energizing the auxiliary commutating winding from the excitation circuit of the shunt type field winding; a differential commutating winding; a magnetic amplifier including a core, an energizing winding, an output winding, a first bias winding, and a second bias winding, and adapted to provide an output which varies with variations in the algebraic sum of the biases; energizing means connected to the energizing winding; circuit means connecting the output winding to the differential commutating winding for energizing the same; additional circuit means connecting the first bias winding to the shunt field excitation circuit whereby the excitation of the first bias winding varies in accordance with variations in the current in the shunt field; and other circuit means connecting the second bias winding to the armature circuit whereby the excitation of the second bias winding varies in accordance with variations in the current in said armature, said first and second bias winding being wound and excited differentially with respect to each other.

7. Apparatus according to claim 6 wherein the magnetic amplifier is additionally characterized as having a fifth winding, and direct current energizing means connected to the fifth winding for establishing a flux reference level in the core of said magnetic amplifier.

8. A variable speed direct current motor including an armature, a compensating winding, a commutating winding, an armature circuit connecting said armature, said compensating winding and said commutating winding in series, a shunt type field winding, a field excitation circuit including means for varying the excitation of said shunt type field winding over a considerable range, a first auxiliary commutating winding, means connected to the field excitation circuit for energizing the first auxiliary commutating winding therefrom, a second auxiliary commutating winding, said second auxiliary commutating winding being wound and excited differential to the first auxiliary commutating winding, and means operatively connected to the second auxiliary commutating winding for automatically varying the excitation of the second auxiliary commutating winding in accordance with changes in the speed and load of the motor whereby the second auxiliary commutating winding bucks out the first auxiliary commutating winding at no-load conditions, the second auxiliary commutating winding having the excitation thereof reduced as the load increases to a point whereat at a predetermined load condition the excitation of the second auxiliary commutating winding falls substantialy to zero.

9. A variable speed direct current motor including an armature, a compensating winding, a commutating winding, an armature circuit including energizing means connecting the armature, the compensating winding and the commutating winding in series, a shunt type field winding, a shunt field circuit including means for varying the excitation of said shunt type field winding over a considerable range, a first auxiliary commutating winding, means connecting the first auxiliary commutating winding to the shunt field winding to be excited by current flowing in the shunt field winding, the first auxiliary commutating winding being cumulative with respect to said commutating winding, a second auxiliary commutating winding, said second auxiliary commutating winding being differential with respect to both the commutating winding and the first auxiliary commutating winding, and means for energizing the second auxiliary commutating winding, said last-named means including means for varying the excitation of the second auxiliary commutating winding in accordance with variations in the excitation of the shunt field winding and in accordance with variations in the current in said armature.

10. A variable speed direct current motor including in combination, an armature, a compensating winding, a commutating winding, an armature circuit connecting the armature, the compensating winding and the commutating winding in series, shunt type field winding, field circuit means including means for varying the excitation of said shunt field winding over a considerable range, a first auxiliary commutating winding wound cumulative with respect to said commutating winding, circuit means connecting the first auxiliary commutating winding to said field circuit means for exciting the first auxiliary commutating winding by the current flowing in the shunt type field winding, a second auxiliary commutating winding, said second auxiliary commutating winding being wound and excited differential with respect to both the commutating winding and the first auxiliary commutating winding, magnetic amplifier means adapted to have the output thereof varied for exciting the second auxiliary commutating winding, first control means connecting the magnetic amplifier means to the armature circuit for varying the output of the magnetic amplifier means in accordance with variations in the current in the armature circuit, and second control means connecting the magnetic amplifier means to the field circuit means for varying the output of the magnetic amplifier means in accordance with variations in the current in the field winding, said first control means and second control means acting differentially with respect to each other.

11. An interpole flux control circuit for use in a dynamoelectric machine having an armature and a field winding comprising, in combination, winding means on said interpole for creating a commutating flux therein which varies in accordance with variations in at least one of the currents in said armature and said field winding, additional winding means on said interpole, saturable magnetic means for energizing the additional winding means, first control circuit means connecting the saturable magnetic means to the armature for varying the output of the saturable magneic means in accordance with variations in the current in said armature, and second control circuit means connecting the saturable magnetic means to the field winding for varying the output of the saturable magnetic means in accordance with variations in the field current to thereby energize the additional interpole winding means variably in accordance with the variations in both the armature current and the field current.

12. Apparatus for controlling the flux in an interpole winding of a direct current motor having an armature and a field winding comprising, in combination, a magnetic amplifier having first and second bias windings, a source of alternating current energizing potential for the magnetic amplifier, and circuit means including rectifier means connecting the output of the magnetic amplifier to the interpole winding to energize the same, the first bias winding being adapted to be connected to the armature circuit of the motor to have the bias flux generated thereby varied in accordance with variations in the current in the armature, the second bias winding being adapted to be connected to the field winding of the motor to have the bias flux generated thereby varied in accordance with variations in the excitation of the field winding, the excitation of the interpole winding being accordingly varied in accordance with variations in both the armature current and the field current.

13. Interpole flux control apparatus for use in a shunt wound direct motor including a shunt field winding and an armature, comprising an interpole winding, a variable source of excitation for said interpole winding, first control means connecting the source of excitation to the armature whereby the excitation of the interpole winding is automatically varied in accordance with variations in the armature current, and second control means connecting the source to the shunt field winding whereby the excitation of the interpole winding is automatically varied in accordance with variations in the current in the shunt field winding.

14. Apparatus according to claim 13 wherein the first control means and the second control means are additionally characterized as being differential with respect to each other.

15. In a variable speed direct current motor including an armature, a field pole and an interpole, in combination, a shunt type field winding on the field pole, field circuit means including means for varying the excitation of said shunt type field winding over a considerable range, a compensating winding on the field pole and a commutating winding on the interpole both connected in series with the armature in an armature circuit, a cumulative auxiliary commutating winding on the interpole, means for energizing the cumulative auxiliary commutating winding from the field circuit means of the shunt type field winding variably in accordance with variations in the shunt field winding current, a differential auxiliary commutating winding on the interpole, and energizing means connecting the differential auxiliary commutating winding to the field circuit means and to the armature circuit for variably energizing the differential auxiliary commutating winding in accordance with variatons both in the current in the field winding and in the current in said armature.

16. A motor according to claim 15 additionally characterized in that the energizing means tends to reduce the amount of energization of the differential auxiliary commutating winding as the armature current increases, and tends to increase the amount of energization of the differential auxiliary commutating winding as the current in the field winding increases.

No references cited.

ORIS L. RADER, *Primary Examiner.*

G. SIMMONS, *Assistant Examiner.*